No. 736,009. Patented August 11, 1903.

UNITED STATES PATENT OFFICE.

CARL V. PETRAEUS, OF IOLA, KANSAS.

TREATMENT OF ORES CONTAINING ZINC OR OTHER METALS.

SPECIFICATION forming part of Letters Patent No. 736,009, dated August 11, 1903.

Application filed November 19, 1901. Serial No. 82,865. (No specimens.)

*To all whom it may concern:*

Be it known that I, CARL V. PETRAEUS, a citizen of the United States of America, residing in Iola, in the county of Allen, in the State of Kansas, have invented a new and useful Improvement in Treatment of Ores Containing Zinc or other Metals, of which the following is a true and exact description.

My invention relates to the treatment of ores or concentrates containing zinc and other valuable metals—such as lead, copper, silver, and gold — my object being to provide a method of treating such ores by which their metallic contents can be secured in commercial forms and at moderate cost.

As heretofore treated, ores of the character indicated above, even when their metallic contents as a whole are of considerable value, have proved unremunerative for commercial working, because, when treated for the extraction of their contained zinc, the residues containing the other metals have been of such a character that they could not as a rule be worked commercially, while, on the other hand, the treatment of such ores for the extraction of their metallic contents other than zinc has generally been at the expense of their zinc values. In the treatment of such ores for the extraction of their zinc by the ordinary retort process of smelting, the residue left in the retorts contains a considerable percentage of zinc and practically all of the other metallic constituents of the ore. This residue is, however, light, bulky, and porous, and aside from the presence of zinc in it, which is highly detrimental, it is physically in a very poor condition for smelting and has as a rule been treated as a waste product.

My present invention is based on my discovery that this retort residue, which includes a large percentage of the coked carbonaceous material charged into the retorts with the ore, can be treated, in admixture either with such coked carbonaceous material or with such coke separated therefrom and fresh coal in admixture with it, in a compound reducing and oxidizing furnace, with the double effect of driving off the zinc, together with some of the lead, as a sublimate, which sublimate can be separated by screening from the furnace-gases and of cindering together the residue, which contains most of the metals other than zinc, bringing it into such physical condition that it is perfectly adapted for the ordinary smelting treatment.

My invention accordingly consists in, first, mixing the ore with carbonaceous material, and then subjecting the mixture to the ordinary retort process for smelting and volatilizing the zinc, condensing the volatilized zinc, as usual, then treating the metal-bearing residue, either in admixture with the coke from the retorts or with a fresh carbonaceous material, in a compound reducing and oxidizing furnace, so as to drive off the greater part of the remaining zinc as a metal-fume and at the same time to consolidate and cinder together the metal-bearing residue, preferably screening the furnace-gases, so as to separate and save the zinc oxid, and, finally, smelting the cindered residue in order to extract its contained metals.

Having now described my invention, what I claim as new, and desire to secure by Letters Patent, is—

1. The method of treating zinc ores containing other valuable metals, which consists in mixing said ores with carbonaceous material, smelting and volatilizing a large portion of the zinc by heating the mixture in with exclusion of air, recovering the volatilized zinc by condensation, treating the metal-bearing residue of the distillation process in admixture with carbon, to drive off the zinc as an oxid-fume and, at the same time, cinder together the residue, containing the other valuable metals, by heating the mixture to a sufficient temperature in an oxidizing-atmosphere, and then smelting said cindered residue, to recover its contained metals.

2. The method of treating zinc ores containing other valuable metals, which consists in mixing said ores with carbonaceous material, smelting and volatilizing a large portion of the zinc by heating the mixture with exclusion of air, recovering the volatilized zinc by condensation, treating the metal-bearing and carbonaceous residue of the distillation process, to drive off the zinc as an oxid-fume and, at the same time, cinder together the residue containing the other valuable metals, by heating the mixture to a sufficient temperature in an oxidizing-atmosphere, recovering said metal-fume by screening the furnace-gases, and smelting said cindered residue, to recover its contained metals.

CARL V. PETRAEUS.

Witnesses:
EDWD. C. REGUS,
D. STEWART.